(No Model.)  3 Sheets—Sheet 1.

J. B. ADT.
MACHINE FOR CUTTING TOBACCO.

No. 498,454.  Patented May 30, 1893.

(No Model.)  3 Sheets—Sheet 2.
J. B. ADT.
MACHINE FOR CUTTING TOBACCO.

No. 498,454. Patented May 30, 1893.

WITNESSES
Dan'l Fisher
Geo. E. Taylor

INVENTOR
John B. Adt,
by W. T. Howard,
atty.

(No Model.) 3 Sheets—Sheet 3.

J. B. ADT.
MACHINE FOR CUTTING TOBACCO.

No. 498,454. Patented May 30, 1893.

WITNESSES
Dan'l Fisher
Geo. E. Taylor

INVENTOR
John B. Adt,
by G. H. & W. T. Howard,
atty.

UNITED STATES PATENT OFFICE.

JOHN B. ADT, OF BALTIMORE, MARYLAND.

MACHINE FOR CUTTING TOBACCO.

SPECIFICATION forming part of Letters Patent No. 498,454, dated May 30, 1893.

Application filed June 28, 1892. Serial No. 438,249. (No model.)

*To all whom it may concern:*

Be it known that I, JOHN B. ADT, of Baltimore, Maryland, have invented certain Improvements in Machines for Cutting Tobacco, of which the following is a specification.

In the description of the invention which follows, reference is made to the accompanying drawings forming a part hereof, and in which—

Figure 1:
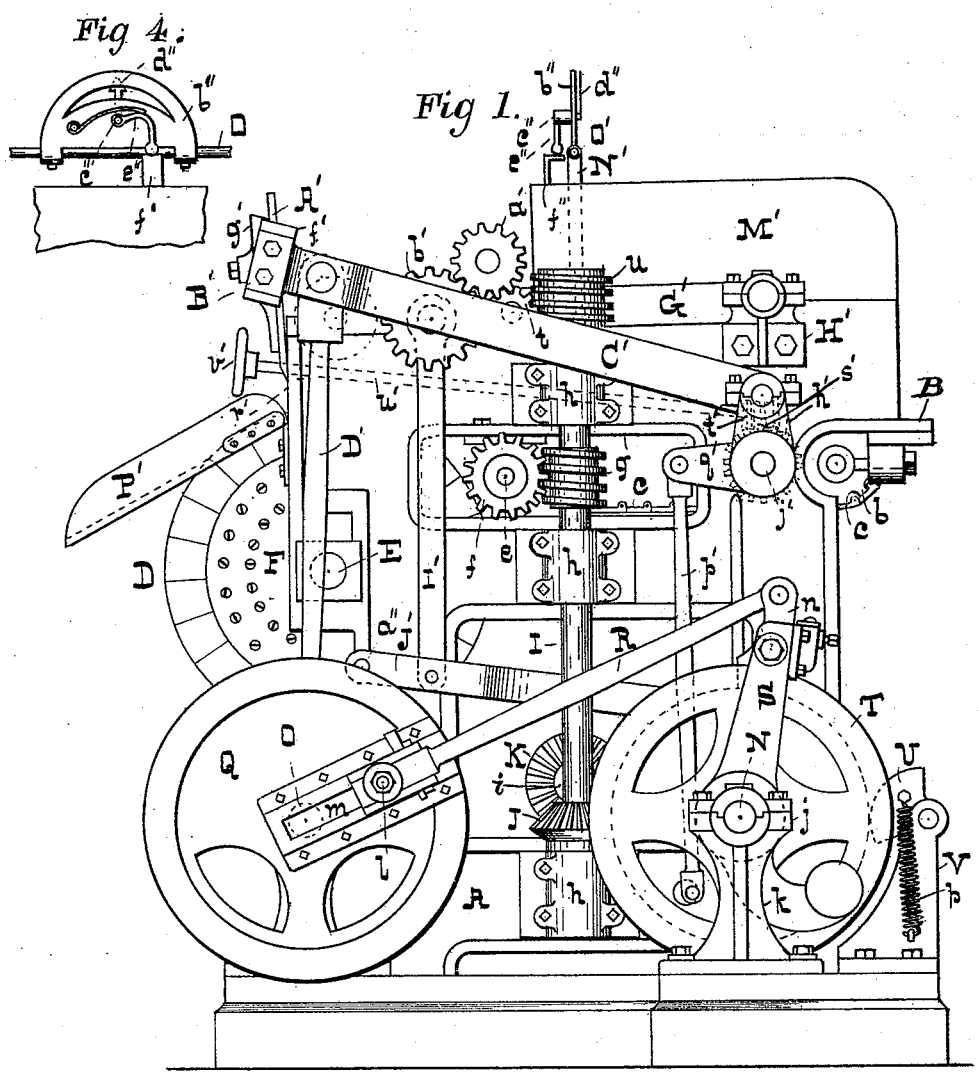
Figure 2:
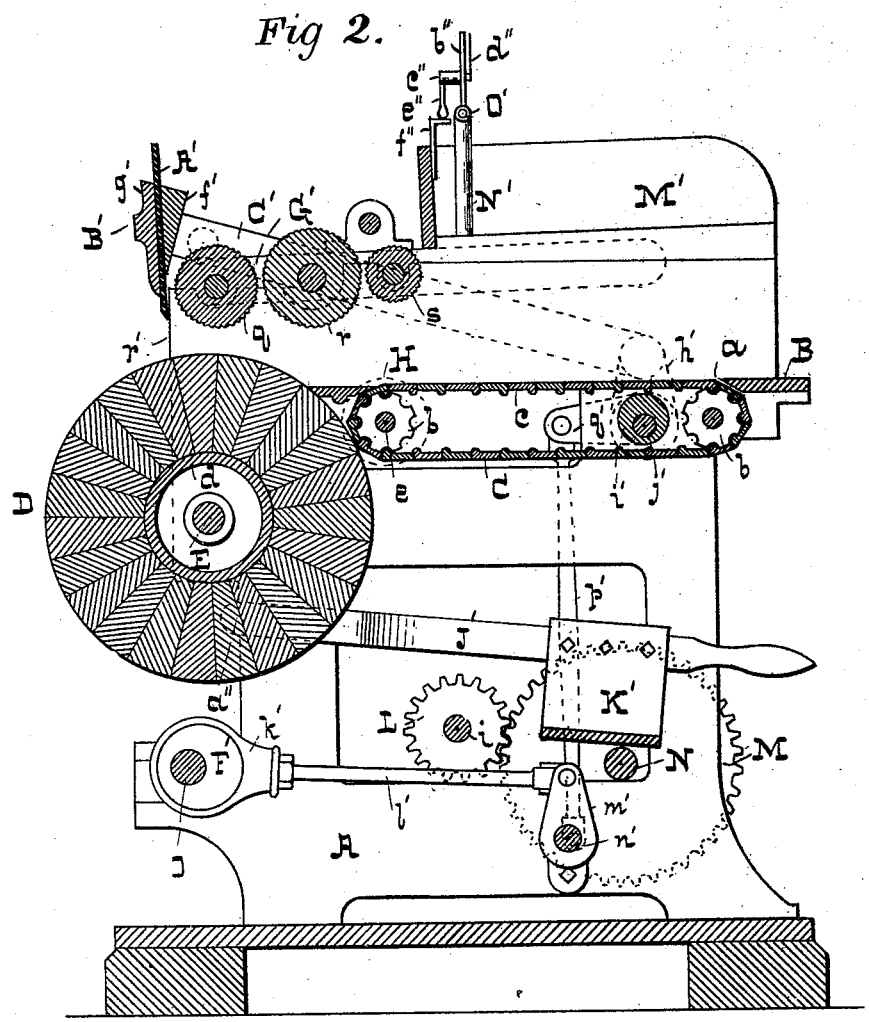
Figure 3:
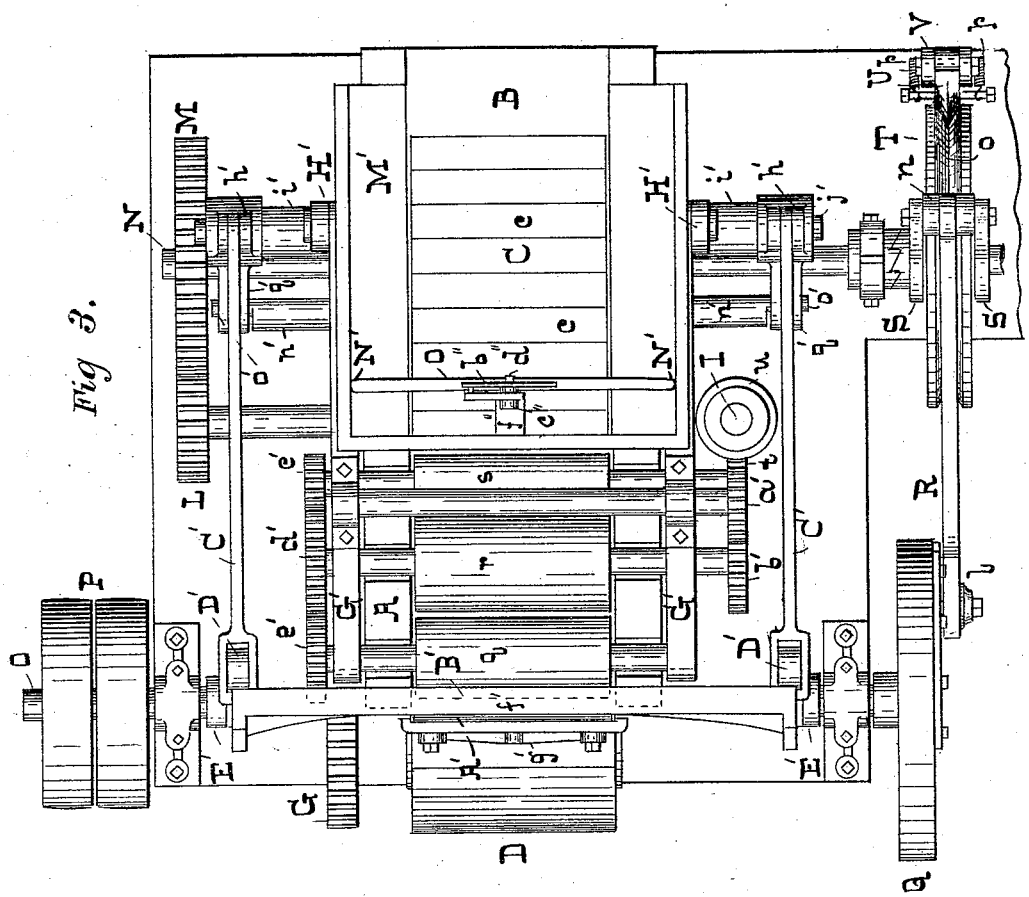

Figure 1 is an exterior side elevation of the improved machine. Fig. 2 is a central longitudinal section of the same as seen from the same point of view. Fig. 3 is a top view of the machine, and Fig. 4 is a detail of the same.

In the said drawings, A is the frame of the machine.

B is a table having a central opening $a$ in which is supported, by suitable sprocket-wheels $b$, an endless chain C formed of slats $c$ of any suitable length, hinged together.

The table B together with the endless belt C, constitutes a surface upon which the tobacco to be cut is placed. At the forward end of the table B is a cylindrical drum or rotary chopping-block D, formed of wood in segments, resting on a skeleton hub $d$ of iron which in turn is secured to a shaft E. At the ends of this drum are circular plates F secured to the wood segments by means of screws.

On the shaft E at one end thereof, is a gear-wheel G driven by a pinion H (shown only in dotted lines in Fig. 2) on the shaft $e$ supported in suitable bearings in the frame A. This shaft, $e$, carries also the sprocket-wheel $b$ next to the drum D. The shaft $e$ has also a worm-wheel $f$ in gear with a worm $g$ on a vertical shaft I which is adapted to be rotated in suitable bearing-boxes $h$ bolted to the frame A. On the lower end of this upright shaft I is a beveled-gear J in mesh with a similar gear K on a shaft $i$ extending horizontally and transversely of the machine. At the other end of this shaft $i$ is a pinion L in gear with the wheel M on a shaft N resting in bearing-boxes $j$ formed in the upper ends of standards $k$.

O is the main driving-shaft having the tight and loose pulleys P at one end, and at the other end the crank-wheel Q. The crank-pin $l$ is adjustable within a slot $m$ in the wheel Q so that its stroke may be altered and any suitable means may be employed to effect the adjustment.

R is a pitman connecting the crank-pin $l$ to a friction-pawl $n$ on the end of an arm S in two sections, adapted to vibrate loosely on the shaft N. Between the two parts of the arm S, and secured to the shaft N, is a wheel T having an annular groove $o$ in which the friction-pawl $n$ is situated. A backward movement of the wheel T is prevented by a friction-pawl U hinged to a stand V and having springs $p$ to keep the pawl in place.

Three corrugated compressing-rollers $q$, $r$ and $s$ situated above the drum D and a part of the table B, assist in feeding the tobacco. The spindle of the roll $s$ has a worm-wheel $t$ in mesh with a worm $u$ on the upright shaft I, and this worm-wheel is in gear with a spur-wheel $a'$ which drives the spur $b'$ on the spindle of the roller $r$. The roller $s$ has a spur-gear $c'$ in mesh with an idle spur-gear $d'$ on the spindle of the roll $r$, which engages with the spur-gear $e'$ on the spindle of the roller $q$. It will be seen that the vibratory movement of the arm S derived from the main driving-shaft O through the crank-pin $l$ and the pitman R, communicates an intermittent rotary motion to the wheel T and through the shaft and the gearing described, effects an intermittent rotary motion of the compression rolls $q$, $r$, and $s$ and the drum D. At the same time, the endless chain belt C receives a similar movement which carries the tobacco to the feeding and compressing rolls.

A' is a knife for shearing the tobacco from the compressed block fed by the rolls. The knife is secured between the two parts $f'$ and $g'$ of the head B', and this head is fastened to the ends of two vibratory levers C' connected to the double arm $h'$ of a bell-crank lever secured to an eccentric sleeve $i'$ on a shaft $j'$. The vibratory levers C' are operated by means of links D' leading to cranks E' on the main driving-shaft O. While they are vibrating they also have an endwise movement derived from an eccentric F' on the main driving shaft.

The mechanism connecting the eccentric F' with the double arm $h'$ of the bell-crank lever on each side of the machine to which the levers C' are attached, consists of an eccentric-strap $k'$, rod $l'$, arm $m'$ on rocking-shaft $n'$, crank $o'$ on each end of the rocking-shaft $n'$, links $p'$ and the double arm $q'$ forming the other member of the bell-crank lever. By this arrangement of mechanism the knife is caused to describe an approximately semi-elliptical path in its upward movement, and a vertical path in its downward movement. The object of this semi-elliptical movement is to prevent the knife from interfering with the feed, as while the knife is being elevated the tobacco is forced forward.

The adjustment of the knife so that it will just touch the face $r'$ of the mouth-piece of the frame is accomplished by means of a worm-wheel $s'$ on the eccentric-sleeve $t'$, and a worm $t'$ on a bar $u'$ having a hand-wheel $v'$. By turning this hand-wheel the eccentric-sleeve is thrown around, carrying with it the hub of the bell-cranks. The spindles of the corrugated compression feed-rolls $q$, $r$ and $s$ rest in bars G' pivoted to brackets H' bolted to the frame A. Rods I' pivoted to the bars G' extend downward and are connected to other bars J' having their fulcra at $a''$; and at the free end of these bars J', is attached a box K' in which are placed weights to hold down, with a yielding pressure, the feed compression-rolls $q$, $r$ and $s$. By this means, should the compressed block of tobacco become too thick, the said rolls are raised and the tobacco passes freely to the knife.

M' is an open bottom box secured to the pivoted bars G', and has a movement in common with them.

N' N' are rods attached to the frame of the machine, connected together at their upper ends by a bar O'. On this bar is a segmental scale $b''$, having at its center a movable pin $c''$. At one end of this pin is a pointer $d''$ and at the other an arm $e''$ the end of which rests on a bent bar $f''$ secured to the box M'. The pointer is arranged so that the thickness of the block of tobacco is indicated by numerals on the scale.

P' is a chute to carry off the cut tobacco to any receptacle placed to receive it.

The machine being in operation, the tobacco is packed on the table and the endless chain belt which latter carries it forward to and under the compression rolls $q$, $r$ and $s$, and between them and the drum D; and the end of the block thus formed is sheared off by the reciprocating knife which at each downward stroke comes in contact with the face of the said drum. As before stated the thickness of the cut may be regulated. Hence cut tobacco suitable for any desired purpose may be produced.

I claim as my invention—

1. In a machine for cutting tobacco, the shearing-knife attached to the end of a pair of vibratory levers pivoted to an arm having also a vibratory movement, and means substantially as described, whereby the said arm is vibrated in unison with the knife-levers, so as to produce an eccentric path for the said knife, substantially as specified.

2. In a machine for cutting tobacco, the combination with an endless feed-belt and a series of intermittently rotated compression rollers, of an intermittently rotated chopping-block, a stationary mouth-piece, a shearing-knife attached to the end of a pair of vibratory levers pivoted to an arm having also a vibratory movement, and means whereby the said arm is vibrated in unison with the knife-levers, substantially as described.

3. In a machine for cutting tobacco, the combination with an endless feed-belt and a series of vertically yieldable compression-rollers, of a rotary chopping-block, a stationary mouth-piece, a shearing-knife attached to the end of a pair of vibratory levers pivoted to an arm having also a vibratory movement, and means whereby the said arm is vibrated in unison with the knife-levers, substantially as described.

JOHN B. ADT.

Witnesses:
JNO. T. MADDOX,
DANL. FISHER.